United States Patent [19]

Coney et al.

[11] Patent Number: 4,473,336
[45] Date of Patent: Sep. 25, 1984

[54] TURBINE BLADES

[75] Inventors: Michael H. Coney, Littleover; Andrew G. Dutton, Stockport; David A. Richardson, Mickleover, all of England

[73] Assignee: Rolls-Royce Limited, London, England

[21] Appl. No.: 418,022

[22] Filed: Sep. 14, 1982

[30] Foreign Application Priority Data

Sep. 26, 1981 [GB] United Kingdom ................ 8129155

[51] Int. Cl.³ .............................................. F01D 5/18
[52] U.S. Cl. ............................... 416/96 R; 416/96 A; 416/97 R; 416/223 R; 416/223 A; 416/225; 416/241 R
[58] Field of Search ........... 416/224, 225, 226, 241 R, 416/95–97 R, 241 B, 223 R, 223 A, 500; 415/115

[56] References Cited

U.S. PATENT DOCUMENTS

| | | | |
|---|---|---|---|
| 2,401,826 | 6/1946 | Halford | 415/115 |
| 2,479,057 | 8/1949 | Bodger | 416/224 |
| 2,497,041 | 2/1950 | Bodger | 415/200 |
| 2,501,038 | 3/1950 | Fransson | 416/95 |
| 2,855,179 | 10/1958 | Brown | 416/189 |
| 3,378,228 | 4/1968 | Davies | 416/95 |
| 3,396,349 | 8/1983 | Hueber | 416/96 A |
| 3,443,792 | 5/1969 | Moss | 415/214 |
| 3,619,077 | 11/1971 | Wile et al. | 415/115 |
| 3,992,127 | 11/1976 | Booher, Jr. et al. | 415/214 |
| 4,076,451 | 2/1978 | Jankot | 415/200 |
| 4,285,634 | 8/1981 | Rossman | 416/97 A |

FOREIGN PATENT DOCUMENTS 2084262 4/1982 United Kingdom ........... 416/229 A

Primary Examiner—Carroll B. Dority, Jr.
Assistant Examiner—Brian J. Bowman
Attorney, Agent, or Firm—Cushman, Darby & Cushman

[57] ABSTRACT

The present invention relates to turbine blades and in particular to turbine blades for use in gas turbine engines. Tensile stresses are introduced into turbine blades when they rotate at high speeds on a turbine rotor. In order to minimize the stresses in an outer skin of an aerofoil of the turbine blade, the outer skin is secured to a platform and an inner core, and in operation a temperature difference is set up between the outer skin and the inner core. The temperature difference produces a thermal compressive stress in the outer skin which opposes the tensile stress produced due to the rotation of the turbine blade. The extremities of the outer skin may be secured to the platform with either a tensile or compressive prestress depending upon the temperature difference between the outer skin and inner core at normal operating conditions. If the operating speed of the gas turbine engine changes, the temperature difference between the outer skin and the inner core may be varied in order to adjust the thermal compressive stress in the outer skin, so that the tensile stress in the outer skin may be opposed, to ensure the stresses in the outer skin are maintained at a minimum during operation of the engine.

10 Claims, 5 Drawing Figures

TURBINE BLADES

The present invention relates to turbine blades and in particular to turbine blades for use in gas turbine engines.

Tensile stresses are induced in turbine blades when they are rotated at high speeds on a turbine rotor. It is advantageous to minimise the stresses in turbine blades, in order to lengthen the creep life of the turbine blade and to reduce the thickness of the aerofoil skin to give a relatively lighter blade, and to enable greater operating speeds to be achieved.

The present invention seeks to provide a turbine blade in which in operation the stresses in the aerofoil skin are minimised.

Accordingly the present invention provides a turbine rotor blade comprising a root, a platform and an aerofoil, the aerofoil and the root being secured to opposite faces of the platform, the aerofoil comprising an outer skin which defines the aerofoil and an inner core arranged within and spaced from the outer skin, and the outer skin is secured to the inner core and the platform, such that in use a temperature difference is set up between the outer skin and the inner core, the said temperature difference introducing a thermal compressive stress into the outer skin, and the thermal compressive stress in the outer skin opposes any tensile stress introduced into the outer skin due to the rotation of the turbine blade.

The present invention also provides that the outer skin may be secured to the inner core and the platform with a tensile prestress, such that in use a temperature difference is set up between the outer skin and the inner core, the said temperature difference introducing a thermal compressive stress into the outer skin, and the compressive thermal stress in the outer skin opposes the tensile prestress, and any tensile stress introduced into the skin due to the rotation of the turbine blade.

The present invention also provides that the outer skin may be secured to the inner core and the platform with a compressive prestress, such that in use a temperature difference is set up between the outer skin and the inner core, the said temperature difference introducing a thermal compressive stress into the outer skin, and the thermal compressive stress and the compressive prestress oppose the tensile stress introduced into the outer skin due to the rotation of the turbine blade.

The outer skin may have an area of reduced thickness at any section.

The area of reduced thickness may be at the mid-section of the outer skin.

The inner core may be tapered.

The temperature difference between the outer skin and the inner core may be set up by cooling the inner core with a supply of cooling air, the cooling air being supplied through air passages in the root and the platform to the aerofoil.

The present invention also provides that in operation the temperature difference between the outer skin and the inner core, and the associated thermal compressive stress may be varied to oppose any change in the tensile stress introduced into the outer skin due to changes in the speed of rotation of the turbine blade.

The temperature difference between the outer skin and the inner core may be varied by altering the supply of cooling air.

The outer skin may have a ceramic coating.

The invention will be more fully described with reference to the accompanying drawings in which FIG. 1 shows a cut-away view of a gas turbine engine showing turbine blades according to the present invention.

Figure 1:
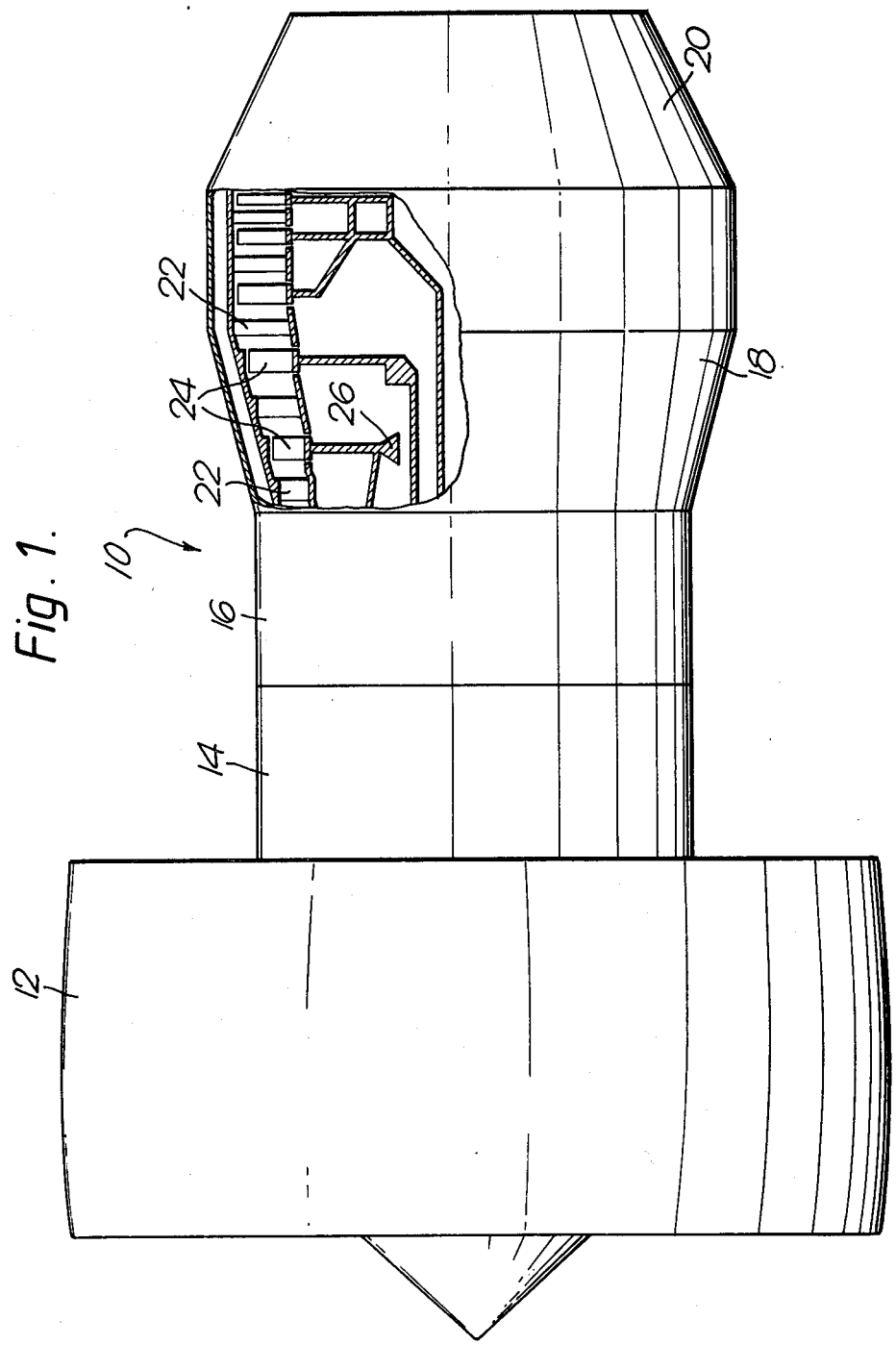

FIG. 1 shows a gas turbine engine 10 which comprises in flow series a fan 12, a compressor 14, a combustion system 16, a turbine section 18 and an exhaust nozzle 20. The turbine section 18 comprises alternate turbine vanes 22 and turbine blades 24, the turbine blades 24 being mounted on rotors 26.

Figure 2:
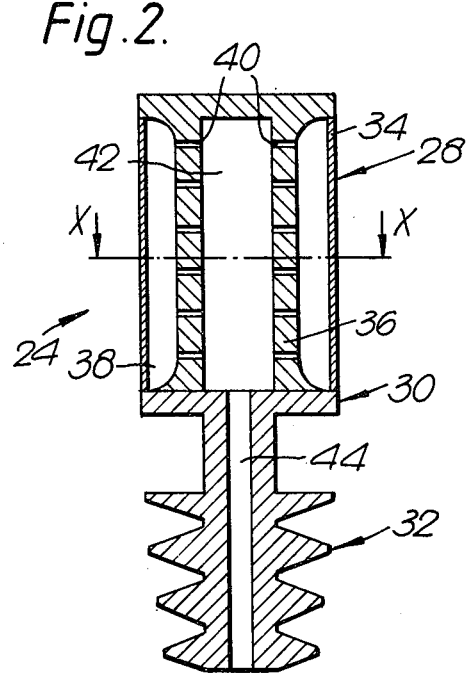
FIG. 2 shows an enlarged cross-section through one embodiment of a turbine blade shown in FIG. 1.
Figure 3:
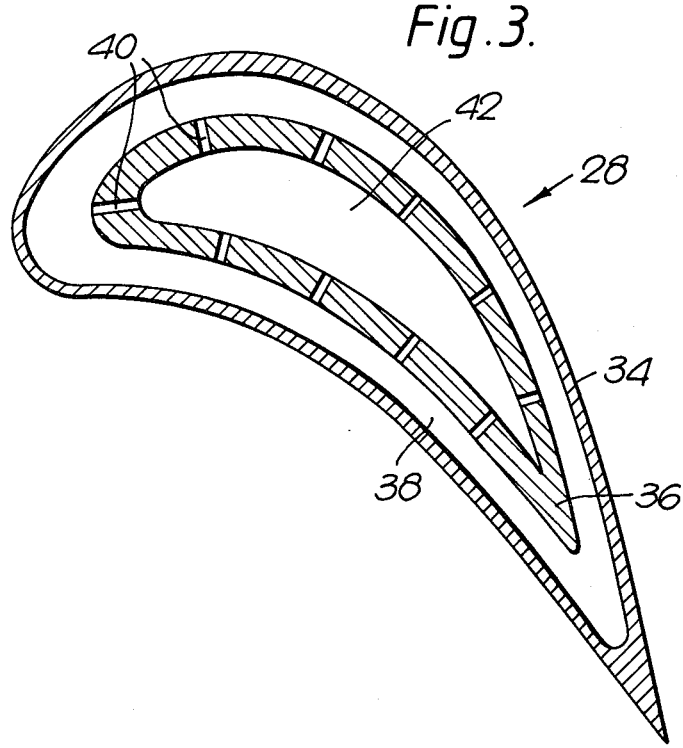
FIG. 3 shows a cross-section along the line X—X through the turbine blade in FIG. 2.

FIGS. 2 and 3 show one turbine blade 24 according to the present invention which comprises an aerofoil 28, a platform 30 and a root 32. The aerofoil 28 and the root 32 are secured to opposite faces of the platform 30, and the aerofoil 28 comprises an outer skin 34 which defines the shape of the aerofoil 28 and an inner core 36 is arranged within and spaced from the outer skin 34. A chamber 38 is formed between the inner core 36 and the outer skin 34 and a number of impingement tubes 40 are formed through the inner core 36 to connect the chamber 38 with an air passage 42 formed within the inner core 36.

The inner core 36 is secured to the platform 30, and the outer skin 34 is secured to the platform 30 and to the inner core 36 with either a tensile prestress or a compressive prestress depending on the specific application and operating conditions of the turbine section 18 of the gas turbine engine 10. The initial tensile or compressive prestress in the outer skin may be produced by holding the outer skin and inner core at different temperatures during manufacture, so that as the blade cools a prestress is produced in the outer skin.

Another air passage 44 extends from the air passage 42 in the aerofoil 28 through the platform 30 and the root 32.

Figure 4:
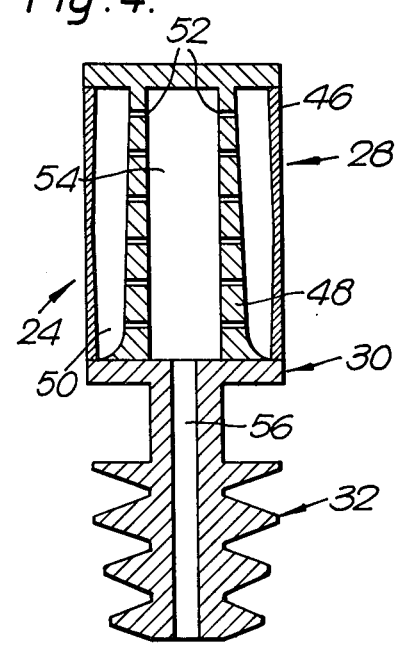
FIG. 4 shows an enlarged cross-section through another embodiment of a turbine blade shown in FIG. 1.

FIG. 4 shows another turbine blade 24 according to the present invention which comprises an aerofoil 28, a platform 30 and a root 32. The aerofoil 28 and the root 32 are secured to opposite faces of the platform 30, and the aerofoil 28 comprises an outer skin 46 which defines the shape of the aerofoil 28 and an inner core 48 is arranged within and spaced from the outer skin 46. A chamber 50 is formed between the inner core 48 and the outer skin 46 and a number of impingement tubes 52 are formed through the inner core 48 to connect the chamber 50 with an air passage 54 formed within the inner core 48. An air passage 56 extends from the air passage 54 in the aerofoil 28 through the platform 30 and the root 32. The inner core 48 is tapered and is secured to the platform 30, and the outer skin 46 has an area of reduced thickness, in this case, at its mid-section and is secured to the platform 30 and to the inner core 48 with either a tensile or compressive prestress depending on the application or operating conditions of the gas turbine engine 10. The prestress may again be produced as previously mentioned.

Figure 5:
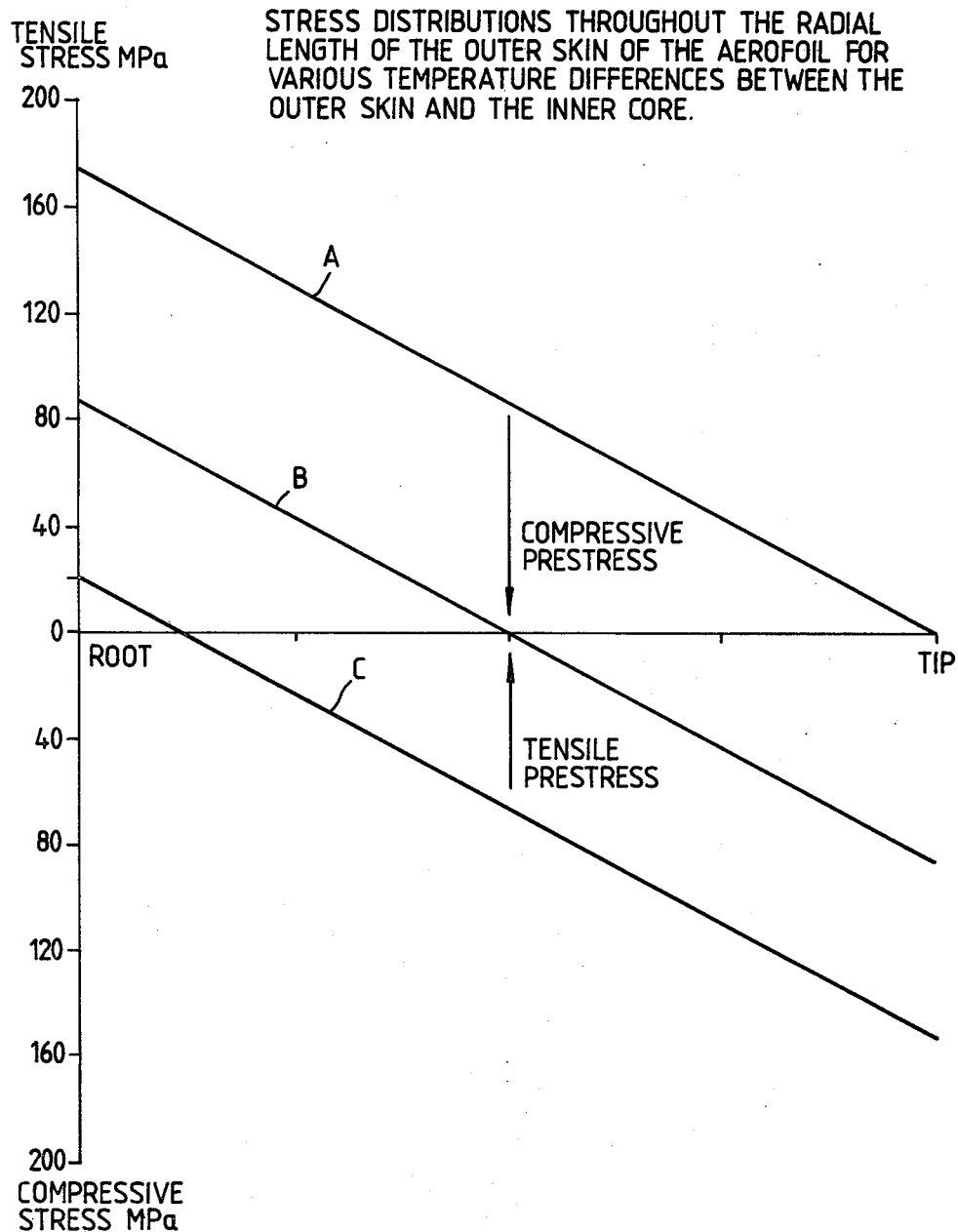
FIG. 5 shows a graph of the resultant stress in the outer skin of the aerofoil throughout the radial length of the outer skin for various temperature differences between the outer skin and the inner core when in operation.

FIG. 5 shows a graph of the resultant operating stresses in the outer skin of the aerofoil 28 throughout the radial length of the outer skin.

Line A corresponds to the resultant stress in the outer skin of the aerofoil when the turbine rotates at a speed of 1047 radians per second (rad/sec) with no temperature difference between the inner core and the outer skin.

Line B corresponds to the resultant stress in the outer skin of the aerofoil when the turbine rotates at a speed of 1047 rad/sec with a temperature difference of 90° C. between the inner core and the outer skin, and Line C corresponds to the resultant stress in the outer skin of the aerofoil when the turbine rotates at a speed of 1047 rad/sec with a temperature difference of 150° C. between the inner core and outer skin.

The outer skin and the inner core are both made of MAR-M002 Alloy in this particular case.

In operation, with reference to FIG. 1, air enters the gas turbine engine 10 and flows through the fan 12 where it is given an initial compression. The air flow then divides, a first portion, called bypass air, flows around the remainder of the gas turbine engine 10. The second portion, called core air, flows into the compressor 14 where it is further compressed before being burnt with fuel in the combustion system 16 to produce hot exhaust gases. The exhaust gases flow through the turbine section 18 and drive the turbines which drive the fan 12 and compressor 14 via a number of shafts. The exhaust gases then pass through the exhaust nozzle 20.

The turbine blades 24 which are mounted on rotors 26 rotate at high speeds and experience tensile stresses due to their high speed of rotation.

Referring to FIG. 5, it can be seen from line A that the outer skin of the aerofoil experiences a tensile stress throughout its radial length but which diminishes gradually to zero at the tip. Lines B and C show that as the temperature difference between the outer skin and the inner core increases, a thermal compressive force is exerted by the inner core on the outer skin which produces a thermal compressive stress in the outer skin when the inner core is cooler than the outer skin. Line B shows that at a temperature difference of 90° C. between the outer skin and the inner core the thermal compressive stress is equal and opposite to the rotational tensile stress at the mid-section of the outer skin, when the turbine is rotating at a speed of 1047 rad/sec.

It can be seen that the total stress in the outer skin is a minimum when the blade is operating on line B.

Temperature differences of other than 90° C., in this case, necessitate the use of an initial tensile or compressive prestress to return to the optimum stress distribution in line B.

It is advantageous to design the turbine blade so that at normal operating conditions, the stress at the mid-section of the outer skin is zero and the total stress in the outer skin is a minimum. This can be achieved by choosing a prestress, and a temperature difference between the outer skin and the inner core which will produce zero stress at the mid-section of the outer skin when the gas turbine engine and the turbine blade are at normal operating speeds.

It may be desireable to design the turbine blade so that at normal operating conditions, the stress at particular section other than the mid-section of the outer skin is zero. This again can be achieved by choosing a prestress, and a temperature difference between the outer skin and the inner core which will produce zero stress at the particular section of the outer skin, when the gas turbine engine and the turbine blade are at normal operating conditions.

Should higher or lower operating speeds be required the temperature difference between the outer skin and the inner core, and the thermal compressive stress, may be increased or decreased by the relative amount, to oppose the increase or decrease in the rotational tensile stress, to reduce the deterioration of the creep life of the outer skin.

One method of achieving a turbine blade which has a zero stress at the mid-section of the outer skin of the aerofoil, is to give the outer skin an initial tensile prestress, and to operate the turbine blade with a temperature difference greater than 90° C. between the inner core and outer skin.

FIGS. 2 and 3 show a turbine blade 24 in which a tensile prestress is applied to the outer skin 34 of the aerofoil 28, and in operation a temperature difference is set up between the outer skin 34 and the inner core 36 by supplying cooling air through the air passage 44, the air passage 42 and the impingement tubes 40 to the chamber 38. The cooling air cools the inner core 36 to a temperature below that of the outer core 34, and the temperature difference so produced introduces a thermal compressive stress into the outer skin 34. The temperature difference is chosen so that the thermal compressive stress is equal and opposite to the resultant of the tensile prestress and the rotational tensile stress at the midsection or any other particular section of the outer skin 34 at normal operating speeds.

FIG. 4 shows an alternative turbine blade 24 in which a tensile prestress is applied to the outer skin 46 of the aerofoil 28, and in operation a temperature difference is set up between the outer skin 46 and the inner core 48 by supplying cooling air through the air passage 56, the air passage 54 and the impingement tubes 52 to the chamber 50. The temperature difference is again chosen so that the thermal compressive stress equals the tensile prestress and the rotational tensile stress at the mid-section or any other particular section of the outer skin 46 at normal operating speeds. The outer skin 46 has an area of reduced thickness, in this case at the mid-section, where the stress is zero, to reduce the weight of the blade. The inner core 48 is tapered to produce a uniform stress distribution throughout the radial length of the inner core which again reduces the weight of the blade.

The outer skin may have an area of reduced thickness at the mid section or any particular section chosen where the stress is zero in order to reduce the weight of the blade without weakening the outer skin.

The inner core may be tapered from the root to the tip in order to reduce the weight of the blade to produce a uniform stress distribution throughout the radial length of the inner core without impairing the strength of the blade.

Although the invention has been described with reference to an initial tensile prestress it may be, in some cases, desirable to operate the turbine blade with a relatively small temperature difference between the outer skin and the inner core and this will necessitate the use of an initial compressive prestress, in a particular case the thermal compressive stress may be equal and opposite to the rotational tensile stress, and no prestress will be required.

When the gas turbine engine 10 operates at speeds higher than the normal operating speed, the tensile stress increases throughout the radial length of the outer skin, and the total stress in the outer skin increases. In this type of turbine blade the stress distribution can be optimised by increasing the temperature difference between the outer skin and the inner core by the relative amount, which will increase the thermal compressive stress by the relative amount, to equal the increase in the tensile stress at the mid-section, or any particular desired section.

Similarly when the gas turbine engine operates at speeds lower than the normal operating speed, the tensile stress decreases throughout the radial length of the outer skin, and the total stress in the outer skin increases. The temperature difference between the outer skin and the inner core may be reduced by the relative amount, which will reduce the thermal compressive stress at the mid-section or any particular desired section.

The outer skin and the inner core may be made from any suitable metal alloy, but the outer skin may also be coated with a thin layer of a ceramic material to provide heat and corrosion resistance for the aerofoil of the blade.

The temperature difference and corresponding thermal compressive stress, the initial tensile or compressive prestress may be varied to suit the normal operating conditions of the gas turbine engine.

The use of a thermal compressive stress with an initial prestress to oppose the tensile stress produced due to rotation of the turbine blade, enables the total stress in the outer skin of the aerofoil to be kept to a minimum.

This results in greater creep lifes for the aerofoil of the turbine blade and enables the turbine blades and the gas turbine engine to be operated at relatively higher speeds.

We claim:

1. A turbine blade for mounting on a rotor of a gas turbine engine, said turbine blade comprising:
   a root for attachment to said rotor;
   an aerofoil member;
   a platform having opposite faces, one face of said opposite faces being secured to said root and another face of said opposite faces being secured to said aerofoil member;
   said aerofoil member including a metallic outer skin defining an external fluid engaging surface, a metallic inner core arranged within and spaced from said metallic outer skin, said metallic inner core being rigidly secured at one end thereof to said other of said opposite faces of said platform and rigidly secured at another end to one extremity of said metallic outer skin, said metallic outer skin having an opposite extremity rigidly connected to said platform so as to provide a tensile rotational stress in said metallic outer skin during normal operating speed of said turbine;
   means to provide a prestress of predetermined value in said metallic outer skin; and
   means to set up a temperature difference between said metallic outer skin and said metallic inner core to introduce a thermal compressive stress of a desired predetermined value in said metallic outer skin at normal operating speed, said means to provide said prestress in said metallic outer skin and said means to set up said temperature difference between said metallic outer skin and said metallic inner core to provide said thermal compressive stress in said metallic outer skin being chosen so that a resultant of said prestress, said thermal compressive stress and said tensile rotational stress is zero at a desired section of said metallic outer skin when the turbine blade is rotating at normal operating speed thereby reducing total stress in said metallic outer skin.

2. A turbine blade as claimed in claim 1 in which said means to provide said prestress of predetermined value in said metallic outer skin includes securing said outer skin to said inner core and said platform with a tensile prestress.

3. A turbine blade as claimed in claim 1 in which said means to provide said prestress of predetermined value in said metallic outer skin includes securing said metallic outer skin to said inner core and said platform with a compressive prestress.

4. A turbine blade as claimed in any one of claims 1 to 3 in which in operation the temperature difference between the outer skin and the inner core, and the associated thermal compressive stress may be varied to oppose any change in the tensile stress introduced into the outer skin due to changes in the speed of rotation of the turbine blade.

5. A turbine blade as claimed in claim 4 in which the temperature difference between the outer skin and the inner core is varied by altering the supply of cooling air.

6. A turbine blade as claimed in any one of claims 1 to 3 in which said means to set up said temperature difference between said metallic outer skin and said metallic inner core to introduce said thermal compressive stress in said outer metallic skin includes air passages through said root and said platform for supplying cooling air to said inner core.

7. A turbine blade as claimed in claim 1 in which said desired section of said metallic outer skin has an area of reduced thickness.

8. A turbine blade as claimed in claim 7 in which said desired section is at a mid-section of said metallic outer skin.

9. A turbine blade as claimed in claim 1 in which the inner core is tapered.

10. A turbine blade as claimed in claim 1 in which the outer skin has a ceramic coating.

* * * * *